J. MARSH.
PISTON RING.
APPLICATION FILED MAR. 19, 1919.

1,330,381.

Patented Feb. 10, 1920.

Inventor
J. Marsh,

By Munn & Co.

Attorney

UNITED STATES PATENT OFFICE.

JOHN MARSH, OF CHICAGO, ILLINOIS.

PISTON-RING.

1,330,381.  Specification of Letters Patent.  Patented Feb. 10, 1920.

Application filed March 19, 1919. Serial No. 283,460.

*To all whom it may concern:*

Be it known that I, JOHN MARSH, a citizen of the United States, and a resident of Chicago, in the county of Cook and State of Illinois, have invented certain new and useful Improvements in Piston - Rings, of which the following is a specification.

My invention relates to improvements in piston rings and more particularly to rings used on piston rods in steam engines, steam pumps, and the like.

The object of my invention is to provide packing means for piston rods, that will provide steam tight joints in stuffing boxes, or glands, and at the same time permit perfectly free functional movements of the piston rod at a low cost and with a minimum of wear and friction.

Figure 1:
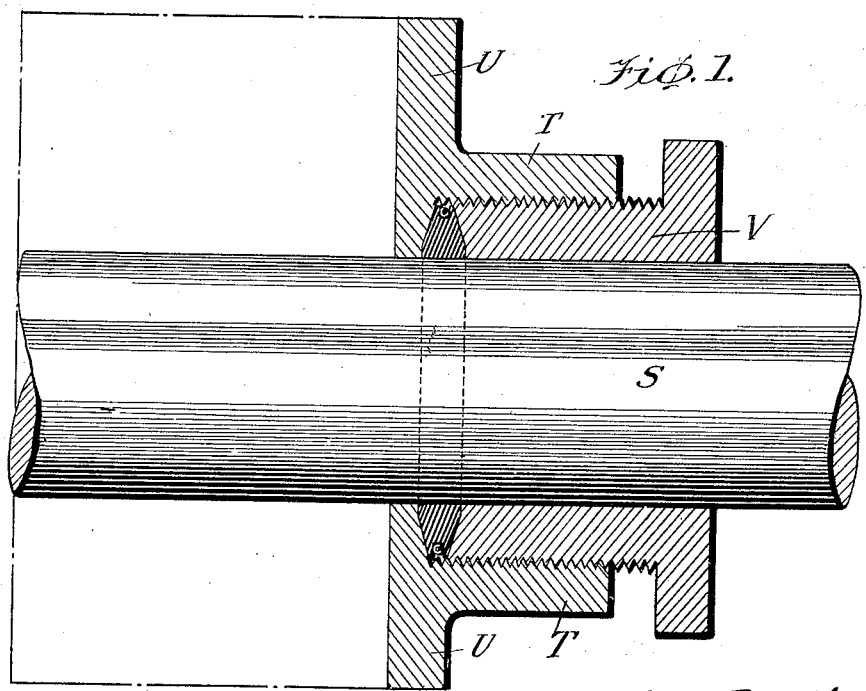
Figure 2:
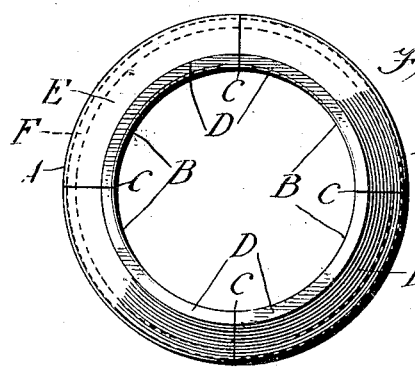
Figure 3:
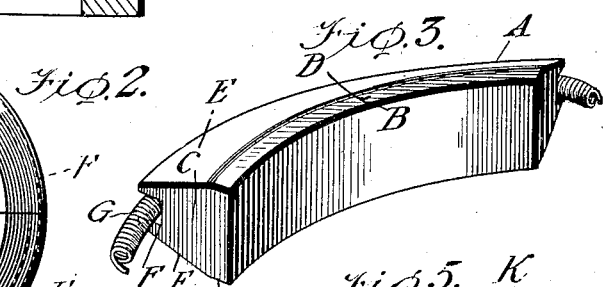
Figure 4:
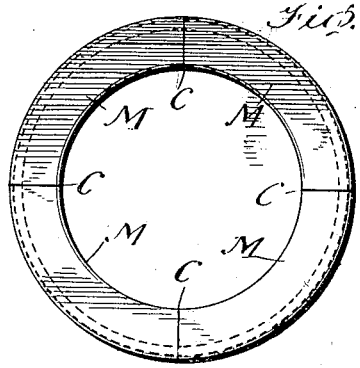
Figure 5:
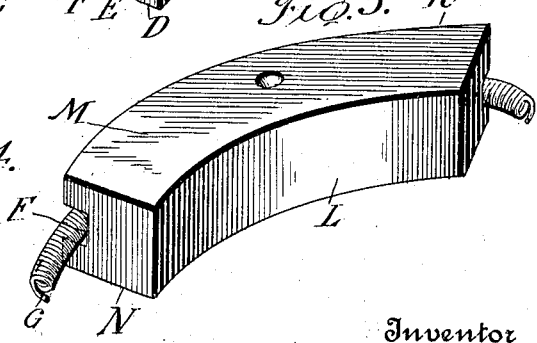

With these and other objects, my invention consists in certain novel features of construction, arrangement and combination of parts as will be hereinafter described and pointed out in the claim, reference being had to the accompanying drawing in which:

Figure 1 is a longitudinal section through a cylinder head and stuffing box showing application and use of my improvements, Fig. 2 is a plan view of one of my improved piston rod rings, Fig. 3 is a perspective view of one of the sections composing such ring, Fig. 4 is a plan view of another form of the same ring, and Fig. 5 is a perspective view of the form of ring illustrated in Fig. 4.

In carrying out my invention which consists essentially in making an alloy ring in sections, I use a plurality of segments A made of an alloy that will not be injurious to the piston rod. These segments as illustrated in Figs. 1, 2 and 3 are made with smooth inner walls B and radial ends C. The upper and lower face of each segment is flat for a slight width as shown at D and said upper and lower flat portions are parallel; from these flat portions the upper and lower faces converge toward the outer circumference or arc as illustrated at E, resulting in the outer arc of the segment being narrower than the inner face B; in this narrow or thin outer wall is made rectangular channel or groove F the floor of said groove and the side walls being on straight lines. The groove or channel itself has an arcuate shape, the arc being struck from the same center as the inner wall B. The office of the groove is to receive a tightly coiled spring tubular band G of the retractile type. The spring band itself is normally a straight tube composed of tightly coiled convolutions g, and the end convolutions terminate in hooks which are preferably disposed perpendicular to each other so that they may readily engage each other. In assembling the sections the inner walls B which are of course struck on the same arc as the shaft S, three of the sections are laid upon a flat object and the resilient band placed around them within the grooves with the ends coupled together. The fourth section is then forced into place by placing one end against a free end of one of the other sections and the other end of the inserted section is forced outwardly, the resilient band being at the same time expanded until the end of the inverted section snaps into place completing the circle and the band is then allowed to contract. This action locks all the sections in place and retains them in their proper relative position. The ring or rings may then be slipped over the shaft S into the stuffing box T on the cylindrical head U and the gland nut V run down into place clamping the piston rod ring or rings in place and by compression causing them to hug the shaft tightly yet freely enough to permit perfect action of the piston. The ring or rings A may be used alone or with any suitable textile packing rings now commonly in use.

In Figs. 4 and 5 I illustrate another form of section, but which embodies the same principles hereinbefore pointed out, to wit, segmental sections, a curved groove in the outer walls, and a contractile resilient compression band seated in the alined grooves and surrounding the completed ring. In this form the segments K are provided with arcuate inner faces L, flat upper and lower faces M and N, and in the upper faces sockets *m* into which pins may be placed to position them, or hold in proper superposed relation.

From the above it will be seen that I produce a simple, cheap and effective metallic piston rod ring that can be quickly applied and removed and that is efficient in operation.

I claim:

Rings for piston rod packing comprising a plurality of soft metal sections each having concentric arcuate inner and outer walls, radial end walls, the outer walls having arcuate grooves concentric with the inner wall, upper and lower walls, said upper and lower walls having the inner portions flat and parallel and of the same arcuate extent, the remaining portions converging outwardly, and a contractile resilient band encircling the sections and housed in the grooves thereof.

JOHN MARSH.

Witnesses:
    EDWARD JOSENHANS,
    WILLIAM A. SCHMIDT.